United States Patent [19]

Remes et al.

[11] 4,366,482
[45] Dec. 28, 1982

[54] TRANSMITTER WITH BUZZER

[75] Inventors: Paul A. Remes, Neenah, Wis.; Brian L. Jorgensen, Westminster, Calif.

[73] Assignee: Overhead Door Corporation, Dallas, Tex.

[21] Appl. No.: 228,539

[22] Filed: Jan. 23, 1981

[51] Int. Cl.³ .............................................. G08C 19/00
[52] U.S. Cl. ............................... 340/825.69; 340/696; 340/825.72; 455/95; 455/115; 331/64; 332/20; 332/39; 49/25
[58] Field of Search ................................ 340/694–696, 340/539, 168 R, 825.69, 825.71, 825.72, 870.09, 870.11, 870.1, 345, 384 E, 384 R; 455/91, 95, 99, 100, 115; 332/20, 39; 331/64; 49/25

[56] References Cited

U.S. PATENT DOCUMENTS

| | | | |
|---|---|---|---|
| 3,001,066 | 9/1961 | Naber et al. | 340/696 |
| 4,010,447 | 3/1977 | Podowski | 340/696 |
| 4,141,010 | 2/1979 | Umpleby et al. | 340/168 R |

Primary Examiner—John W. Caldwell, Sr.
Assistant Examiner—Donnie Lee Crosland
Attorney, Agent, or Firm—Blanchard, Flynn, Thiel, Boutell & Tanis

[57] ABSTRACT

A garage door opener system includes a radio receiver actuable by reception of a preselected radio signal for moving a garage door between opened and closed positions and a portable hand-held transmitter manually actuable to transmit such preselected radio signal to the receiver. The transmitter includes a radio frequency oscillator for producing the radio signal to be transmitted and a modulating means manually actuable to cause the oscillator to transmit a radio signal which is of the preselected form. An audio transducer is connected in parallel with the radio frequency oscillator to the output of the modulating means to produce an audio signal which corresponds in form to the electric signal modulating the radio frequency oscillator, which audio signal is audible to a person holding the portable transmitter.

8 Claims, 4 Drawing Figures

TRANSMITTER WITH BUZZER

FIELD OF THE INVENTION

This invention relates to a garage door opener system of the type actuated by a radio receiver in response to a preselected radio signal from a remote portable transmitter.

BACKGROUND OF THE INVENTION

Radio controlled garage door openers have long been known and are in wide use, being particularly popular in residential use. Such a garage door opener permits the householder by actuation of his hand-hand transmitter and without leaving the comfort and safety of his automobile, to close the garage door against the weather and unwanted intruders as he drives away from his home and upon returning to open the garage door, drive into the garage, and once again close the garage door.

In view of their convenience and security advantages, such radio controlled garage door openers are in many neighborhoods found at closely adjacent homes and many persons traveling through the neighborhood may have hand-held transmitters. To avoid opening of the garage door of one person by the transmitter of another, either through honest inadvertence or dishonest intent, manufacturers have for some time offered radio controlled garage door openers with additional circuitry permitting a given transmitter-receiver pair to be preset to operate with any one of a number of differing radio signals. This makes it less likely that the radio signal required to actuate one garage door would be provided by the transmitters of others. U.S. Pat. No. 4,141,010 issued to Messrs. Umpleby and Apple, discloses an example of a system having such a presettable radio signal, particularly wherein the transmitted radio signal is modulated by a train of ten pulses which are width controlled in a preselected manner.

Despite the long and widespread use of such radio controlled garage door opening systems and despite the now common use of relatively complex transmitter circuitry to permit the individual to select a substantially unique form of transmitted signal, from among a large number of possibly selectable radio signals, disadvantages still remain in existing transmitters of this type, which the present invention is intended to overcome.

Thus, the objects and purposes of this invention include provision of:

A radio controlled garage door opener in which activation of an audible signal at the transmitter provides the user with a direct indication of transmitter operation.

An apparatus, as aforesaid, in which the presence of, or absence of, such signal indicates that the transmitter battery is good or bad while also indicating whether or not the transmitter is enabled to transmit a radio frequency (RF) signal.

An apparatus, as aforesaid, in which the user of the transmitter is provided with an audible alarm related in wave form to the signal modulating the RF oscillator of the transmitter and which, particularly in the case of a transmitter employing a modulating pulse train of distinctive character, provides the person operating the transmitter with a pulsing sound distinctively different from normal environmental sounds, and in which the user of the transmitter is alerted to inadvertent turning on of the transmitter.

An apparatus, as aforesaid, in which a continuous or uncontrolled audible tone alerts the user of the transmitter to the presence of a stuck or defective manual actuation switch on the transmitter, and for example avoids running down of the battery of the transmitter due to jamming of the transmitter into a tight glove compartment in a vehicle or in the purse of the user.

Other objects and purposes of the invention will be apparent to persons acquainted with apparatus of this general type upon reading the following specification and inspecting the accompanying drawings.

SUMMARY OF THE INVENTION

A radio transmitter-receiver garage door opener system includes a radio receiver responsive to reception of a preselected radio signal for moving a garage door between opened and closed positions. A portable hand-held transmitter is manually actuable for causing the receiver to move the door by transmitting of the preselected radio signal. A radio frequency oscillator in the transmitter transmits the radio signal and a modulating unit is manually actuable to electrically energize the radio frequency oscillator to transmit the preselected radio signal. A transducer connected in parallel with the radio frequency oscillator responds to actuation of the manually actuable modulator for simultaneously producing a corresponding audio signal audible to a person holding said portable transmitter.

DETAILED DESCRIPTION

Figure 1:
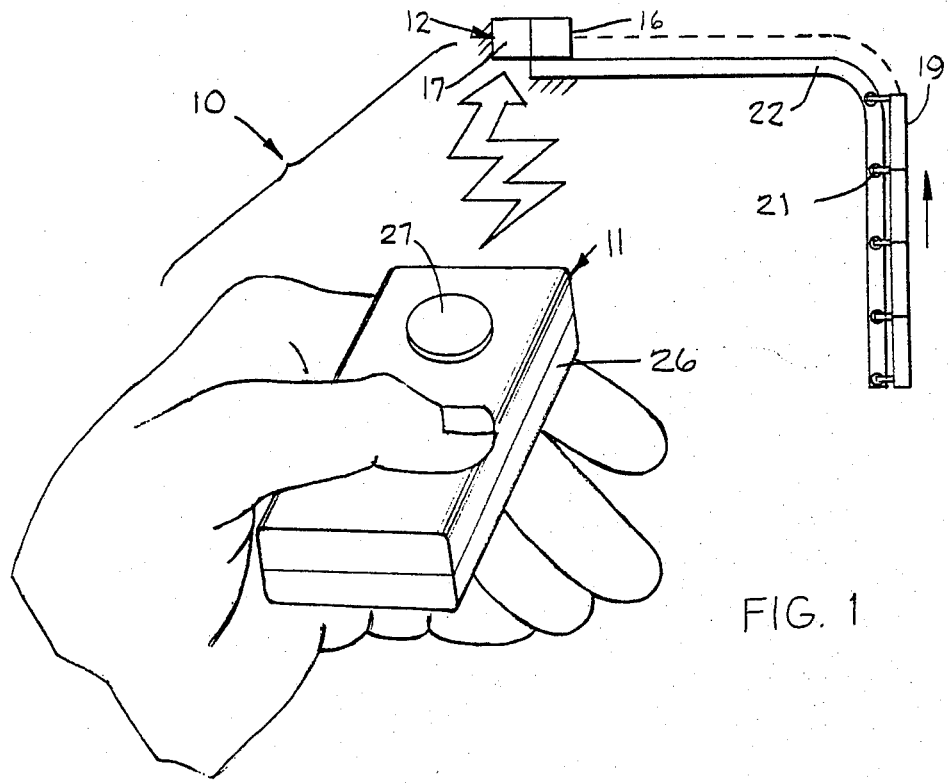
FIG. 1 is a diagrammatic view of a radio controlled garage door opener system embodying the invention.

FIG. 1 discloses a radio controlled garage door opener system 10 embodying the invention. The system 10 includes a hand-held, manually actuable transmitter 11 and a conventional garage mounted unit 12 comprising a door opening motor portion 16 and a radio receiver portion 17. The motor portion 16 conventionally includes a reversible motor (not shown) connected through any convenient mechanical linkage (typically a screw or chain) indicated in broken lines at 18 to a garage door 19 to be opened and closed. In the example shown, the garage door is of the overhead type comprising vertically stacked sections hinged in series and supported by rollers 21 on a track 22 fixed with respect to the garage (not shown). The motor portion 16 includes suitable door position sensing means, such as limit switches (not shown), to provide the desired door operation. Conventionally, the radio receiver portion 17 includes circuitry responsive to reception of a radio signal of preselected kind from the transmitter 11 for causing the motor portion 16 to move the door 19 from the existing one of its opened or closed positions to the other.

The transmitter 11 includes a housing 26 of compact dimensions for hand-held use and for convenient storage in the glove compartment or behind the driver's sun visor in an automobile, or in a purse or the like. At least one manually actuable member, here a push button 27, is conveniently accessible from outside the housing for actuating the transmitter circuitry disposed within the housing 26. The system of FIG. 1, to the extent above described, is conventional.

Figure 2:
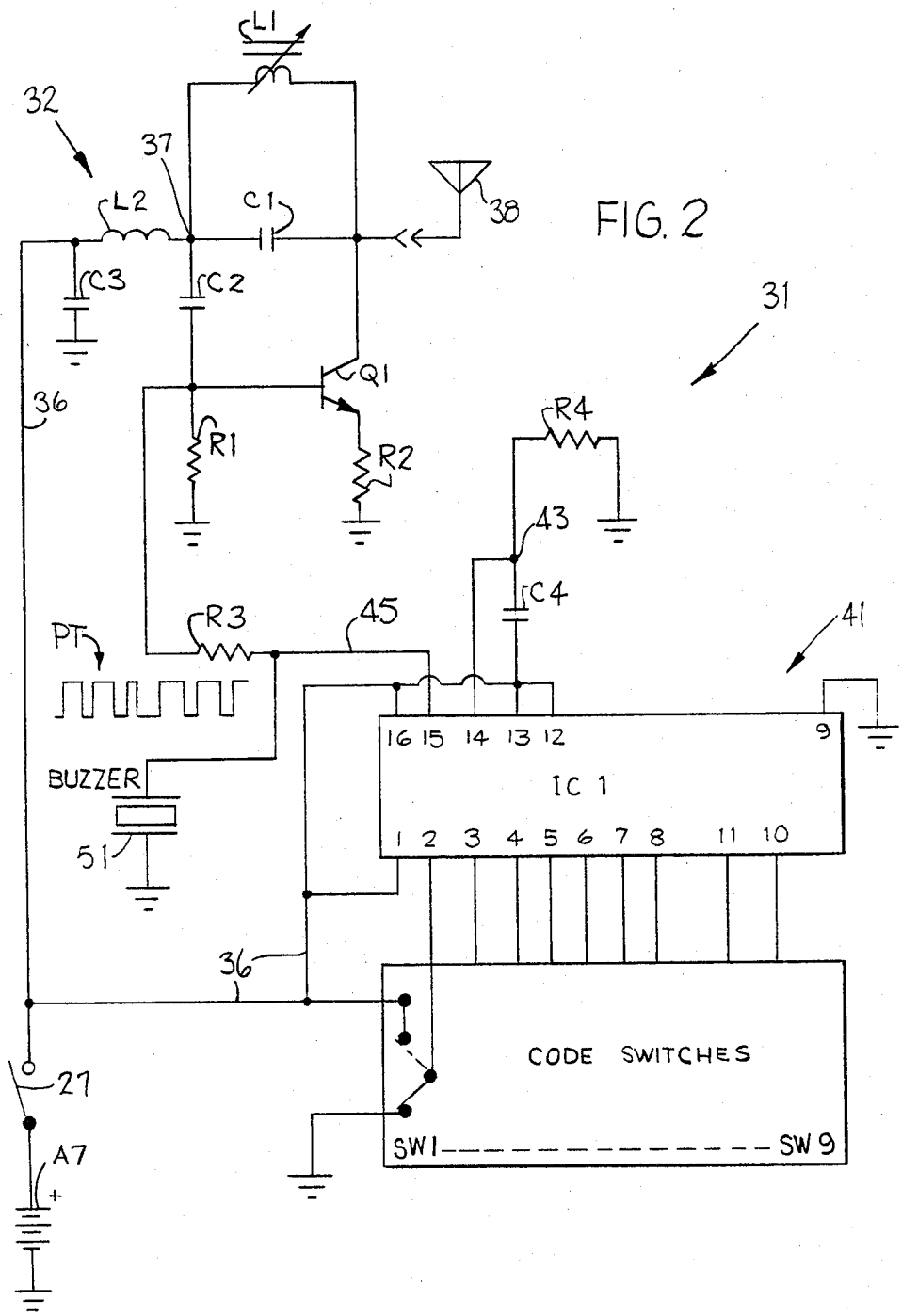
FIG. 2 is a circuit diagram of the transmitter of the FIG. 1 system.

FIG. 2 discloses a preferred embodiment of transmitter circuitry housed within the FIG. 1 transmitter housing 26. The FIG. 2 circuit, generally indicated at 31, includes a radio frequency oscillator 32, the frequency of which is controlled by the setting of a variable inductance L1 connected in parallel with a capacitor C1. The collector of an oscillator transistor Q1 connects through the parallel inductor-capacitor circuit L1, C1 and a further inductor L2 to a positive potential supply line 36, from which transient voltages are shunted to circuit ground through a capacitor C3. Positive feedback is applied to the base of the oscillator transistor Q1 from the common junction point 37 of the inductors L1 and L2 and capacitor C1. Base and emitter bias for the oscillator transistor Q1 is established by resistors R1 and R2 to circuit ground. The oscillator 32 responds to positive potential applied through a resistor R3, as hereafter discussed, to the base of transistor Q1 to produce a radio frequency signal of desired frequency which may be taken from the transistor Q1, as here schematically indicated at the collector thereof, and applied in any conventional manner to a suitable transmitting antenna 38.

A distinctive radio frequency wave form is obtained at the antenna 38 by any convenient means, in the present example by modulating the positive potential applied through resistor R3 to the base of transistor Q1 with a pulse train (a portion of which is schematically shown at PT) consisting of ten pulses width controlled by code circuitry generally indicated at 41. In the embodiment shown, the code circuitry 41 comprises a plurality of code switches SW1 through SW9 manually presettable between alternate positive potential and circuit grounded positions to permit the owner to preselect a desired unique pattern of wide and narrow pulses in the pulse train PT. The code circuitry 41 further includes an integrated circuit IC1 (in the embodiment shown a Model #MM 53206N, available from National Semiconductor, located at 2900 Semiconductor Dr., Santa Clara, Calif. 95051.

The integrated circuit IC1 includes an internal audio frequency pulse producing oscillator having associated therewith an external RC timing circuit to set the audio frequency and comprising a series capacitor C4 and resistor R4 connected between the positive voltage supply line 36 and circuit ground and with the junction point 43 between the RC elements R4 and C4 connected at pin 14 of integrated circuit IC1 to the audio pulse oscillator therein. The integrated circuit IC1 further includes a counter which in response to energization from the positive potential line 36 produces successive, time spaced pulse trains of ten pulses each on counter serial output pin 15 which connects through a conductor 45 and the resistor R3 to modulate the radio frequency oscillator 32. The counter has ten parallel control inputs, numbered 1–8, 10 and 11, which respectively control the width of the ten successive pulses in each pulse train produced at serial output pin 15 of integrated circuit IC1. Of these ten parallel input pins, pin 1 receives a constant positive potential from positive potential line 36 to provide a constant width pulse at one end of the train and remaining parallel input pins 2–8, 11 and 10, respectively, are preset by the user at positive or ground potential in a desired pattern by respective code switches SW1 through SW9. Thus, by appropriate presetting of code switches SW1 through SW9, a pulse train such as that shown as an example at PT (only the five initial pulses of such train being shown) may be created wherein the third pulse is of width less than the first, second, fourth and fifth pulses.

The manual transmit switch 27 is here manually actuable from its normally open position to a normally closed position to connect the positive side of the transmitter battery 47 to the positive potential line to thereby energize the code switches SW1 through SW9, the integrated circuit IC1 and the RF oscillator 32, the opposite side of the battery 47 being connected to circuit ground and thereby to the circuit ground connections of the aforementioned code switches, integrated circuit and RF oscillator. Release of the switch 27 by the operator permits it to open and terminates operation of the integrated circuit IC1 and RF oscillator 32. The above-described apparatus is substantially conventional. Aforementioned U.S. Pat. No. 4,141,010 discloses a similar system.

Turning now more specifically to the improvement effected by the present invention, an alarm device, in the preferred embodiment a piezoelectric buzzer 51, connects in parallel with the radio frequency oscillator 32 across the pulse train output (defined by pin 15 and circuit ground pin 9) of the integrated circuit IC1. Thus, when closure of the manual door operating switch 27 applies a pulse train to the modulating input of the RF oscillator 32 to transmit a radio frequency signal modulated by such pulse train to the receiver portion 17 of the garage mounted unit 12, conventional decoding circuitry in the receiving portion 17 cause the motor portion 16 to move the garage door 19 between its extreme positions. Simultaneously, the pulse train PT is applied to the audio device at 51 which vibrates at the pulse frequency and produces an audible tone, namely a tone incorporating the fundamental pulse train frequency. Accordingly, the person holding the transmitter 11 and pushing actuate button 27 will hear the tone produced by the piezoelectric device 51 as it is activated by the pulse train PT and while the pulse train PT is modulating the radio frequency output of the transmitter 11.

Activation of the buzzer 51 thus provides the human operator with an indication of transmitter operation. Further, the presence of, or absence of, the audible tone indicates a good or bad battery, respectively, and also indicates whether or not the unit is transmitting a modulated RF signal.

A continuous or uncontrolled buzzer tone alerts the owner to the presence of a manual switch 27 which is stuck in its activated position or is defective, and thereby reduces the likelihood of inadvertently running down the battery 47 by jamming the transmitter into a tight glove compartment or purse. In the preferred embodiment shown in FIG. 2, the user has a very high probability of being alerted when the transmitter is turned on inadvertently because the wave form of the pulse train PT imparts to the audio device 51 a sound distinctively different from every other normal sound which the user is likely to encounter in his automobile or surrounding environment, due to the square wave form, and even to the pulse width variation within the train. While the base frequency of the pulse train PT may be selected from a relatively wide range of audio frequencies, in one example a frequency of about 200 Hz was employed.

Figure 2A:
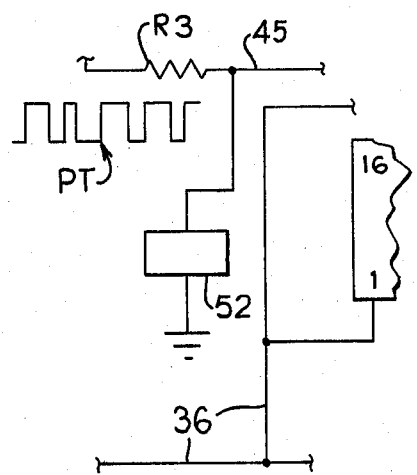
FIG. 2A is a fragment of FIG. 2 but showing a modification.

It is also possible that other kinds of alarm devices, as schematically indicated in FIG. 2A at 52, may be employed instead of or in addition to an audible device 51. However, Applicants recognize that an alarm device of visible type, for example, would not provide the user with all of the above-described advantages of the audible device 51 and particularly would lack the ability to warn of inadvertent turning on of the transmitter switch 27 with the transmitter out of sight of the user and to impart clues as to the pulsed character of the modulating signal applied to the RF oscillator at line 45.

In the preferred embodiment as shown in FIG. 2, the audio device is a Model PKM-11-4AO, manufactured by Murata Corp. of America, located at 415 W. Golf Road, Suite 30, Arlington Heights, Ill. 60005.

Figure 3:
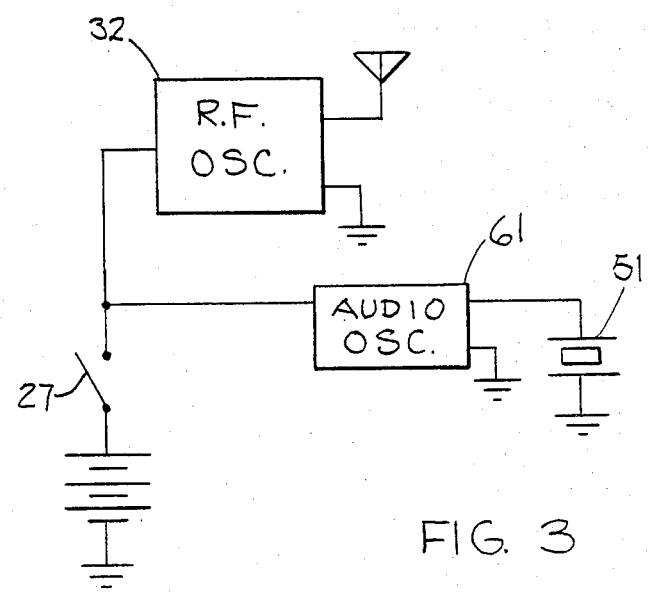
FIG. 3 is a block diagram for a modified transmitter embodying the invention.

FIG. 3 discloses a variation in which the invention is applied to function in a nonpulsed (nondigital) control, wherein no audio frequency modulating source is provided for the RF oscillator 32. In that instance, an audio oscillator 61 is responsive to closure of the manual switch 27 to drive the audible device 51 to produce an audible tone while the RF oscillator 32 broadcasts a door actuating radio signal to a corresponding receiver.

Although particular preferred embodiments of the invention have been disclose above for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a digitally coded transmitter-receiver garage door opener system including:
 a radio receiver responsive to radio reception of a preselected digital code for moving a garage door between its opened and closed positions;
 a portable hand-held transmitter manually actuable for causing said receiver to move said door, by radio transmission of said preselected digitally coded radio to said receiver signal, said transmitter incorporating
 means for generating a pulse train having a preselected number of pulses;
 a plurality of code switches connected to corresponding inputs of said pulse train generating means, said switches being manually positionable to control the width of corresponding pulses in said train so as to digitally encode said pulse train by changing the normal width of selected pulses therein;
 a radio frequency oscillator for transmitting a radio signal to said receiver and connected to said pulse train generating means for modulation by the digitally coded pulse train produced thereby;
 an electric supply manually actuable to energize said radio frequency oscillator and pulse generating means to transmit a radio frequency signal modulated by said digitally coded pulse train; and
 the improvement comprising a human perceptible alarm means connected in parallel with said radio frequency oscillator to the output of said pulse generating means and responsive to application of said pulse train by said pulse generator to said radio frequency oscillator for simultaneously producing a corresponding alarm output perceptible by a person holding said portable transmitter.

2. The apparatus of claim 1 in which said radio frequency oscillator and human perceptible alarm means have their respective input terminals connected in parallel to said pulse generating means for simultaneously receiving the same pulse train and thereby for simultaneously, through two entirely different forms of energy transmission, providing said same pulse train respectively for perception exclusively by said radio receiver and exclusively by said person holding said portable transmitter, said human perceptible alarm means being incapable of causing said moving of said garage door.

3. The apparatus of claim 2 in which said human perceptible alarm means is a piezoelectric buzzer which reproduces said pulse train as an audio wave form corresponding thereto and audible to a person holding said portable transmitter.

4. The apparatus of claim 3 in which said pulse train generating means is an integrated circuit unit comprising a resettable counter and an audio oscillator for stepping said counter through a number of steps equal to the number of pulses in said coded pulse train, said electric supply comprising a battery with one side connected to circuit ground and the other connected through a manually closable switch to a circuit voltage supply line having branches through said radio frequency oscillator and pulse train generating means and code switches all of which are also connected to circuit ground, said pulse train being applied from said pulse train generating means to said radio frequency oscillator through a conductor, said buzzer being connected from said conductor to circuit ground.

5. The apparatus of claim 4 wherein said transmitter is of the type which may be carried in the user's automobile to enable the user to open his or her garage door without leaving said automobile, the frequency of the pulse train applied to said buzzer being about 200 Hz for causing said buzzer to produce an audible tone signal pulsed at said pulse frequency of about 200 Hz for as long as said radio signal is being modulated by said pulse train, such that said user is subjected to an audible sound distinctively different from and additional to other normal sounds likely to be heard in an automobile and such that unintended operation of said transmitter can be sensed by a person in the automobile even with said transmitter located out of hand and sight.

6. In a radio transmitter-receiver garage door opener system including:
 a radio receiver responsive to reception of a preselected radio signal for moving a garage door between its opened and closed positions;
 a portable hand-held transmitter manually actuable for causing said receiver to move said door by radio transmission of said preselected radio signal, said transmitter incorporating
 a radio frequency oscillator for transmitting a radio signal to said receiver;
 modulating means manually actuable to electrically energize said radio frequency oscillator to transmit said radio frequency signal; and
 the improvement comprising an audio means connected in parallel with said radio frequency oscillator and responsive to actuation of said manually actuable modulating means for simultaneously producing a corresponding audio signal audible to a person holding said portable transmitter.

7. In a radio transmitter-receiver garage door opener system, including a radio receiver responsive to reception of preselected radio signals for moving a garage door between its opened and closed position;
- a transmitter actuable for causing said receiver to move said door by radio transmission of said preselected radio signal, said transmitter incorporating
  - a radio frequency oscillator for transmitting a radio signal to said receiver;
  - modulating means connected to the input of said radio frequency oscillator and actuable to electrically energize said radio frequency oscillator to transmit said radio signal; and
  - the improvement comprising an audible sound producing means responsive to actuation of said radio frequency oscillator by said modulator means for simultaneously producing a corresponding audio signal audible to a person holding said portable transmitter; and
  - means connecting in parallel the respective inputs of said radio frequency oscillator and audible sound producing means to the output of said modulating means, the radio signal output of said radio frequency oscillator being independent of said audible sound producing means.

8. In a digitally coded transmitter-receiver garage door opener system including:
- a radio receiver means responsive to radio reception of a preselected digital code for moving a garage door between its opened and closed positions;
- a portable hand-held transmitter manually actuable for causing said receiver means to move said door, by radio transmission of said preselected digital code, said transmitter incorporating
  - means for generating a pulse train having a preselected number of pulses;
  - a plurality of code switches connected to corresponding inputs of said pulse train generating means, said switches being manually positionable to control the width of corresponding pulses in said train so as to digitally encode said pulse train by changing the normal width of selected pulses therein;
  - a radio frequency oscillator for transmitting a radio signal to said receiver and connected to said pulse train generating means for modulation by the digitally coded pulse train produced thereby;
  - an electric supply manually actuable to energize said radio frequency oscillator and pulse generating means to transmit a radio frequency signal modulated by said digitally coded pulse train, said pulse train generating means being an integrated circuit unit comprising a resettable counter and an audio oscillator for stepping said counter through a number of steps equal to the number of pulses in said coded pulse train, said electric supply comprising a battery with one side connected to circuit ground and the other connected through a manually closable switch to a circuit voltage supply line having branches through said radio frequency oscillator and pulse train generating means and code switches all of which are also connected to circuit ground, said pulse train being applied from said pulse train generating means to said radio frequency oscillator through a conductor; and
- the improvement comprising a human perceptible alarm means connected in parallel with said radio frequency oscillator to the output of said pulse generating means and responsive to application of said pulse train by said pulse generator to said radio frequency oscillator for simultaneously producing a corresponding alarm output perceptible by a person holding said portable transmitter,
- said radio frequency oscillator and human perceptible alarm means having their respective input terminals connected in parallel to said pulse generating means for simultaneously receiving the same pulse train and thereby for simultaneously, through two entirely different forms of energy transmission, providing said same pulse train respectively for perception exclusively by said radio receiver means and exclusively by said person holding said portable transmitter, said human perceptible alarm means being incapable of causing said moving of said garage door, said human perceptible alarm means being a piezoelectric buzzer which reproduces said pulse train as an audio wave form corresponding thereto which and is audible to a person holding said portable transmitter, said buzzer being connected from said conductor to circuit ground, said transmitter being of the type which may be carried in the user's automobile to enable the user to open his or her garage door without leaving said automobile, the frequency of the pulse train applied to said buzzer being about 200 Hz for causing said buzzer to produce an audible tone signal pulsed at said pulse frequency of about 200 Hz for as long as said radio signal is being modulated by said pulse train, such that said user is subjected to an audible sound distinctively different from and additional to other normal sounds likely to be heard in an automobile and such that unintended operation of said transmitter can be sensed by a person in the automobile even with said transmitter located out of hand and sight.

* * * * *

UNITED STATES PATENT AND TRADEMARK OFFICE
CERTIFICATE OF CORRECTION

PATENT NO. : 4 366 482
DATED : December 28, 1982
INVENTOR(S) : Paul A. Remes and Brian L. Jorgensen It is certified that error appears in the above—identified patent and that said Letters Patent is hereby corrected as shown below:

Col. 8, line 17; change "generator" to ---generating means---.

Signed and Sealed this

Seventeenth Day of May 1983

[SEAL]

Attest:

DONALD J. QUIGG

Attesting Officer  Acting Commissioner of Patents and Trademarks